US005640320A

United States Patent [19]
Jackson et al.

[11] Patent Number: 5,640,320
[45] Date of Patent: Jun. 17, 1997

[54] METHOD AND APPARATUS FOR VIDEO EDITING AND REALTIME PROCESSING

[75] Inventors: Richard A. Jackson, Nevada City; Richard A. Frasier, Grass Valley; Bill Hensler, Nevada City; David E. Lake; Rachel Rutherford, both of Grass Valley; James E. Chargin, Auburn, all of Calif.

[73] Assignee: Scitex Digital Video, Inc., Grass Valley, Calif.

[21] Appl. No.: 442,178

[22] Filed: May 16, 1995

Related U.S. Application Data

[63] Continuation of Ser. No. 169,326, Dec. 17, 1993, abandoned.

[51] Int. Cl.$^6$ ................................................. G06K 15/00
[52] U.S. Cl. ................................ 364/192; 364/514 A
[58] Field of Search ........................ 364/146, 188–193, 364/514 A; 395/152–155, 162, 164; 360/14.1–14.3, 13, 33.1, 72.2; 358/341, 342, 311, 903, 335; 369/111, 32, 30, 83; 348/578, 579, 384, 722

[56] References Cited

U.S. PATENT DOCUMENTS

| | | | |
|---|---|---|---|
| 4,538,188 | 8/1985 | Barker et al. | 360/14.3 |
| 4,746,994 | 5/1988 | Ettlinger | 360/13 |
| 4,754,342 | 6/1988 | Duffy | 360/14.3 |
| 4,974,178 | 11/1990 | Izeki et al. | 364/523 |
| 5,218,672 | 6/1993 | Morgan et al. | 395/162 |
| 5,227,863 | 7/1993 | Bilbrey et al. | 358/22 |
| 5,237,648 | 8/1993 | Mills et al. | 395/133 |
| 5,278,662 | 1/1994 | Womach et al. | 358/335 |
| 5,307,456 | 4/1994 | MacKay | 395/154 |
| 5,355,450 | 10/1994 | Garmon et al. | 395/162 |
| 5,384,912 | 1/1995 | Ogrinc et al. | 395/164 |
| 5,388,197 | 2/1995 | Rayner | 395/154 |
| 5,396,594 | 3/1995 | Griffith et al. | 395/164 |
| 5,404,316 | 4/1995 | Klingler et al. | 364/514 |
| 5,414,808 | 5/1995 | Williams | 395/154 |
| 5,440,683 | 8/1995 | Nally et al. | 395/162 |
| 5,483,296 | 1/1996 | Nonweiler | 348/719 |

OTHER PUBLICATIONS

"Adobe Premiere™ User Guide—Macintosh™ Version," Sep. 1991, pp. 1–91.

*Primary Examiner*—James P. Trammell
*Attorney, Agent, or Firm*—Limbach & Limbach L.L.P.

[57] ABSTRACT

A method and apparatus for video editing and realtime processing which generates clips. Each clip includes data identifying a scene of a video or audio program, and data identifying processing operations to be applied to the scene. In preferred embodiments, control signals generated from the clips are supplied to a storage subsystem and a processing subsystem. In response, the storage and processing subsystems assemble and process, in realtime, an edited video or audio program from raw scene data stored in the storage subsystem. Typically, each clip contains content data determining the content of a scene (e.g., "begin" and "end" frames of a stored segment of video data) and also processing data (for use by the processing subsystem) identifying processing operations to be performed on a particular scene (or portion thereof) when assembling an edited program from stored scenes. In preferred embodiments, the system of the invention includes an edit controller programmed with software for generating and modifying the clips, and storage and realtime processing subsystems operating under control of the edit controller. The edit controller supplies control signals generated from a sequence of the clips to the storage subsystem and processing subsystem. The processing subsystem preferably includes dedicated hardware for processing scenes of video data (read out from the storage subsystem in response to the control signals from the edit controller) in realtime (while the video data is read out from the storage subsystem) in accordance with the processing data determined by the control signals from the edit controller.

25 Claims, 1 Drawing Sheet

METHOD AND APPARATUS FOR VIDEO EDITING AND REALTIME PROCESSING

This is a continuation of application Ser. No. 08/169,326, filed on Dec. 17, 1993 now abandoned.

FIELD OF THE INVENTION

The invention is a method and apparatus for computer-implemented, video editing and realtime video processing in which processing and content data for each scene of a program are stored and processed together in a single clip. The apparatus of the invention includes a computer programmed to perform video editing operations by creating and manipulating clips representing scenes of a video program, in a manner enabling realtime processing of raw data to assemble the edited program.

BACKGROUND OF THE INVENTION

Throughout the specification, the expression "scene of a video program" (and variations thereon) denotes one or more consecutive frames of video or other image data (optionally with corresponding audio data). A video program can comprise one such scene or a sequence of at least two such scenes. Throughout the specification, the expression "scene of an audio program" (and variations thereon) denotes a single or multitrack analog or digital audio signal. An audio program can comprise one such scene or a sequence of at least two such scenes.

Throughout the specification, the term "clip" denotes data determining a scene of a video or audio program, the term "video clip" denotes data which determines a scene of a video program, and the term "audio clip" denotes data which determines a scene of an audio program.

Throughout the specification, the expression "display of a clip" denotes display of a representation of the clip. Also throughout the specification, the expression "realtime processing" (and variations thereon) denotes processing performed on video data, other image data, or audio data at the standard transmission rate of such data (e.g., the standard NTSC video rate of about 60 fields per second, or the standard PAL video rate of 50 fields per second, for video data).

Typically, an edited video program is determined by a sequence of video and audio clips, some of which may overlap along the program's timeline. Conventional systems for editing a video program typically employ a programmed computer to perform video editing operations in which the computer creates and manipulates clips of the video program. For example, U.S. Pat. No. 4,538,188, issued Aug. 27, 1990, to Barker, et al., describes one such system. The system of U.S. Pat. No. 4,538,188 employs a computer to control the display and manipulation of pictorial "labels," each representing an unedited scene of a video program, to assemble an edited video program from unedited video scene.

Other video editing systems have been proposed which include means for storing unedited video clips (on video tape or laser video disks), and computer means for controlling the display of selected unedited video scenes (or video frames) and generating an edit list in response to user-entered commands.

For example, U.S. Pat. No. 4,796,994, issued May 24, 1988, to Ettlinger, discloses a video editing system in which unedited video data is stored on video tape recorders or video disk players. A computer is programmed to control the video tape recorders and generate an edit list in response to user commands. The computer displays a sequence of menus which prompt the user to perform various editing operations (such as displaying desired frames of the unedited video scene, adding edits to an edit list, and playing back the sequence of video scenes defined by the edit list).

For another example, U.S. Pat. No. 4,754,352, issued Jun. 28, 1988, to Duffy, describes a computer-based video editing system in which unedited video data is stored on video disk players. After generating an edit list, the user may command the system to splice scenes in accordance with the edit list and play back an edited video program. By using a control console with a control buttons and a control dial, the user may command the system to display individual frames of the stored scenes, or "roll" one or more scenes (or an edited sequence of scenes) in forward or reverse motion.

Conventional video editing systems generate clips of a video program, each clip consisting of "content" data identifying the beginning and end ("in" and "out") frames of a stored segment of video data to be included in an edited program (and sometimes also beginning and end points of a corresponding audio soundtrack). Such "content" clips are manipulated in computer software (which may have a graphical timeline display representation) to assemble an edit list which defines the edited program. Conventional edit controllers include computer software for controlling video (and audio) storage devices to selectively copy stored raw video and audio scenes of unedited programs, in a sequence determined by the edit list, to an edited program storage means.

However, it is also desirable during video editing to specify "processing" data which specifies various filters or other processing operations to be applied to an individual scene (or one or more frames within a scene) of an edited program. Consider for example, use of computer-implemented video editing to determine a video program edit list which is in turn used to generate (photographically) a film print whose frames correspond to video frames of the edited video program. In this case, the editor who prepares the edit list typically also prepares elaborate notes about the desired processing operations. These notes are passed on to the film processor, who uses them during preparation of the final film print. The editor cannot see the results of the processing operations that he (she) specifies until after the film processor prepares the final print.

In another example, computer-implemented video editing is employed to generate (electronically) an edited video program. In this case, computer software employed to prepare an edit list (typically in response to user manipulation of graphically displayed clips) and to control recording of video scenes (specified by the edit list) in a program storage device in the sequence specified by the edit list, can also control one or more processing devices for processing frames of the edited program as they are sequentially read out from the program storage device (the processed frames output from the processing device can be displayed to enable the editor to preview the edited program, or can be written back into the program storage device or some other storage device). Thus, processing can be performed at the same time as content editing, to give the editor rapid feedback. Conventional processing devices sometimes include internal memory for storing processing parameters, but they do not have any knowledge of when during a program (i.e., to which scenes and frames of scenes) a given set of processing parameters should be applied. An external controller can be used to trigger a processing device based on the program time (e.g., the processing device can store a control signal from the controller which instructs the processing device to execute "effect X" at "2 minutes and 30 seconds" after the start of the program), but external controllers have not been used to instruct processing devices to perform specified operations on specific scenes (or frames within scenes) regardless of the times at which such scenes are received (in sequence) by the processing device.

A disadvantage of such conventional control of a processing device with an external controller is that, if the editor rearranges the order of scenes in a program (and thus the sequence of data to be read out from the program storage device) after the controller has instructed the processing device to apply a set of processing parameters at a given program time, the processing device will apply the parameters to the wrong frames as it receives the frames from the program storage device.

Because the devices for keeping track of program content (e.g., an edit controller programmed with software for performing edit list generation and for copying stored frames of data to a "program storage device") are separate from those for performing processing on frames of a video program, the operator must do most of the synchronization between the devices in his (her) head, or by keeping meticulous manual notes. This would not be a significant problem if a program were edited only once, and in strict chronological order (in which case the processing could be manually applied once to each scene, as the data defining the scene is copied from a raw scene storage device into the program storage device). Unfortunately, in the real world, programs are often edited and re-edited many times, sometimes by different individuals. Furthermore, recent advances in "non-linear" editing systems (which enable scenes of a program to be edited in non-chronological order) have increased the ease with which program content can be changed, thus increasing the need to remember the processing parameters to be applied to each scene. Without a fully integrated system for remembering both program content and the corresponding processing parameters, an edited program will either take longer to put together (because the operator must remember and reset all of the processing parameters each time he or she makes a change to the "content" of the program), or will have low quality (because the processing device will apply the wrong processing parameters to one or more of the scenes, so that the processing will not match from one scene in the desired manner).

Several techniques have been proposed for sending processing cue signals from an edit controller to a processing device. Typically, the edit controller does not "know" which processing operation will be performed in response to any of the cue signals that it sends. Typically, the user must pre-program the processing device to perform several processing operations (e.g., "Process #1" and "Process #2"), and the edit controller sends cue signals at desired times to the processing device to trigger the next processing operation (e.g., the edit controller "knows" only that a cue signal will trigger "Process #2"). Cue signal generation by the edit controller may be loosely coupled with content parameters (contained in a clip) "known" to the edit controller.

A number of "non-realtime" video editing systems are commercially available. These systems can generate edit lists by manipulating "clips" which represent underlying raw video data, but (unlike "realtime" video editing systems) are incapable of applying necessary processing such as picture compression or other digital video effects to desired stored raw video scenes (or frames of scenes) and assembling the processed scenes into an edited video program, at standard video rate (e.g., about 30 frames per second for NTSC video). In the context of "non-realtime" video editing systems, it is known to include, in the video clips, frame-by-frame calls to one or more filter programs which apply video or audio effects. This method is implemented, for example, in the non-realtime video editing software known as "Adobe Premiere™" software, available from Adobe Systems Incorporated. However, non-realtime systems of this type do not allow the user to see the effects of the filtering operations unless the raw video scenes represented by the clips are rendered in non-realtime to a video storage device (which could include a disk storage means), which can be a very slow operation depending on how many clips are simultaneously playing (i.e., overlapping in time) and the computational effort that is required for the processing required.

Conventional realtime video editing methods and systems have not stored processing data in "content" data-containing clips. Nor have they employed dedicated processing hardware for processing video data (representing scenes of a program) in realtime in accordance with the processing data, while the video data is copied from storage devices to assemble the program in realtime (in accordance with the content data in a sequence of the clips).

SUMMARY OF THE INVENTION

The invention is a method and apparatus for video editing which generates and modifies clips, each clip including data identifying a scene of a video or audio program and data identifying processing operations to be applied to the scene (or portion thereof). In preferred embodiments the clips (or control signals generated therefrom) are supplied to both a storage subsystem and a processing subsystem. In response, the storage and processing subsystems assemble and process (in realtime) an edited (video or audio) program from raw scenes (preferably raw, digital video and/or audio data) stored in the storage subsystem. Each clip contains "content" data determining the content of a scene (e.g., "beginning and end" frames of a stored segment of video data), and also "processing" data (for use by the processing subsystem) which identifies processing operations to be performed on the content (or selected frames thereof) when assembling an edited program from stored scenes.

The clips can be manipulated in software (in an edit controller), for example in response to user commands which shift displayed representations of the clips along a displayed timeline for the program being edited. As the position of a clip along the timeline is changed, the clip's processing data component will follow the clip's content data component (so that both the processing and content data of a clip can be shifted together as a unit along the timeline in response to a simple user command).

In a preferred embodiment, the system of the invention is an integrated video editing and realtime video processing system including an edit controller (programmed with software for generating and modifying the inventive clips), a storage subsystem operating under control of the edit controller, and a realtime processing subsystem operating under control of the edit controller. To generate an edited program, the edit controller (which can be a programmed computer) supplies a sequence of control signals, generated from a sequence of the clips, to both the storage subsystem and processing subsystem. In preferred embodiments, the processing subsystem includes dedicated hardware for processing scenes of video (or audio) data in realtime as they are read out (in realtime) from the storage subsystem in response to the control signals supplied to the storage subsystem from the edit controller. The processing subsystem processes the video (or audio) data from the storage subsystem in realtime, in accordance with processing data contained in the control signals supplied to the processing subsystem from the edit controller.

DETAILED DESCRIPTION OF THE PREFERRED EMBODIMENT

Figure 1:
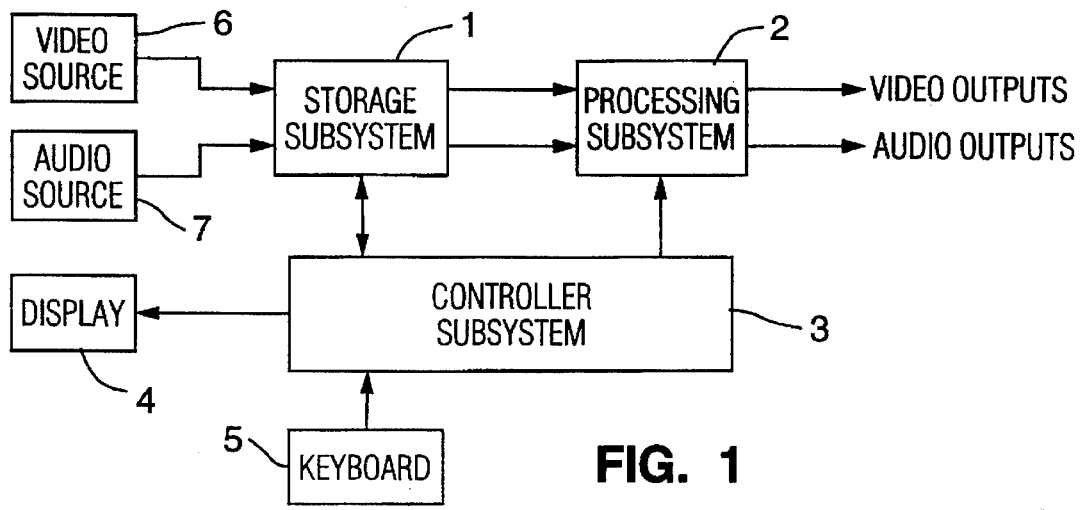
FIG. 1 is a block diagram of a preferred embodiment of the inventive apparatus.

A preferred embodiment of the invention will be described with reference to FIG. 1. The FIG. 1 apparatus includes storage subsystem 1, processing subsystem 2, controller subsystem 3 (which can be a programmed microprocessor for implementing the operations to be described below), monitor 4 (for displaying menus, icons, and other displays useful during performance of editing), computer input device 5 (which can be a keyboard), video source 6, and audio source 7.

Controller subsystem 3 is a microprocessor (or other digital computer) which is programmed to perform digital video (and/or audio) program editing (including generation of the inventive "clips" and arrangement of clips into a sequence defining a video or audio program), and to issue control signals at the realtime rate to storage and processing subsystems 1 and 2. Storage subsystem 1 includes means (such as video disk player/recorders) for storing raw scene data from source 6 or source 7 (or both sources 6 and 7) which can be digital video (or other image) data and/or audio data. Processing subsystem 2 includes dedicated special effects processing (e.g., filtering) hardware for processing image and/or audio data received thereby in realtime. Examples of processing operations performed by processing subsystem 2 include traditional video effects such as keying, wipes, picture sizing, positioning and rotation, as well as mixing (such as cross-fading) of two or more parallel channels of image or audio data.

Controller subsystem 3 is programmed with editing software and user interface software (to be describe below), and software for generating control signals from a sequence of clips. The user interface software is capable of accessing the editing software (and the other system software) in response to commands entered by the user using input device 5 (which can be a keyboard, a mouse, and/or a control panel with dedicated keys or buttons), and is capable of generating editing displays (such as menus and editing icons or other displays) on monitor 4.

Figure 2:
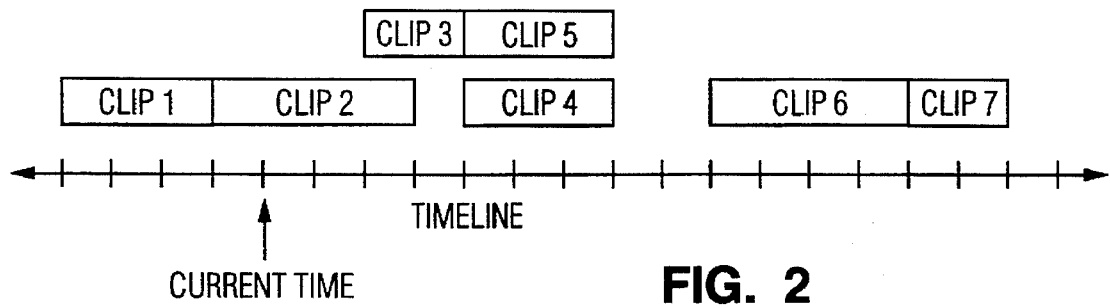
FIG. 2 is a display generated on monitor 4 (of FIG. 1) by controller subsystem 3 (of FIG. 1) during an editing operation.

Digital video data (or other image data) from source 6 and audio data from source 7 representing raw scenes are stored in storage subsystem 1. The memory locations storing each raw scene are determined by a begin address (the memory location of the beginning of the scene's first frame) and an end address (the memory location of the end of the scene's last frame). When a user starts to edit a program based on the raw scene data, controller 3 displays an appropriate window on monitor 4 which prompts the user to select raw scenes (or scene portions) from those stored in subsystem 1. In response to selection of each scene (or portion), controller 3 generates a "clip." Each clip preferably includes content data identifying the first frame and last frame of the underlying scene data stored in storage subsystem 1, a representation of the clip for display on monitor (seven such representations are shown in FIG. 2, each one representing a different clip), and each clip can also include a default "program time" at which the underlying scene is to occur in the program, and a set of default processing parameters for the scene. The user can select menus for modifying the content data of each clip (e.g., by changing the "first" frame or "last" frame) and modifying the processing data of each clip (e.g., by specifying processing parameters other than the default parameters).

Typically, a data structure to be denoted herein as a "program list" is generated along with a set of clips. The program list comprises data identifying each of the clips that is to "play" in a program and the time each clip is to begin in the program. When a program is "played," controller subsystem 3 scans through the program list to see which clip (or clips) should be playing at each frame of the program. If a clip is to be played, controller subsystem 3 processes the clip ("looks" within the clip) to determine at what address in the storage subsystem the clip's content is located (and it issues the appropriate retrieval commands), and controller subsystem 3 also processes the clip to determine what processing should be performed on to the clip's content (and it issues the appropriate commands to processing subsystem 2).

After setting the content and processing data of a number of clips, and arranging the clips into a desired sequence (in which at least some of the clips can overlap or coincide along a displayed program timeline), the user can command the system to play an edited program determined by the arranged sequence of clips. To arrange the clips in sequence, the user can command the editing software of controller subsystem 3 to display a program timeline such as that shown in FIG. 2. The user then operates input device 5 to move displayed representations of the clips in relation to the displayed timeline, and also to modify the content and/or processing data of each clip if desired (for example, to reduce the size of a picture via digital video effects (DVE) hardware). The displayed timeline discussed in this paragraph should be distinguished from the structure also denoted herein as a "program list" (this latter data is not displayed).

Controller subsystem 3 keeps a record of which clips occur at what times in the program (i.e., along the timeline). At any given time in a program, zero, one, or multiple clips can occur. If two video clips overlap along the timeline, the user can control their relative amplitude (or other characteristics) by adjusting the processing data thereof (for example, to mix or blend the pictures together, the transparency of the "top" picture could be reduced to 50% allowing a 50—50 mix of the two pictures). If one or more audio clips overlap a video clip along the timeline, displayed video will be accompanied by an audio soundtrack during playback of the edited program. If no clip occurs during a segment along the timeline, no video or audio will play during that segment of the program (this is usually referred to as occurrence of "black" during the segment).

In a preferred version of the FIG. 1 apparatus, processing subsystem 2 includes seven parallel channels of hardware for simultaneously processing seven parallel digital data streams (up to four audio channels, up to two video channels, and a graphics video channel), and controller 3 can command storage subsystem 1 to supply such seven channels in parallel to processing subsystem 2. During editing, the user can arrange clip representations into as many as seven overlapping rows (which represent the seven channels).

The editing software within controller 3 keeps track of the "current time" from the beginning of a program (as symbolized by the arrow labeled "current time" in FIG. 2). The editing software preferably increments (updates) the current time once for each video field (i.e., approximately once each 1/60 of a second, for NTSC format video), based on whether the system is playing, rewinding, or shuttling video from storage subsystem 1, or is in a pause mode. The ability of controller subsystem 3 to perform this incrementing operation once per field (or frame) at the standard field (or frame) rate of a video signal, and keep track of which video and audio data frame(s) and processing parameters correspond to each "current time" interval, distinguishes it from a general purpose image processing computer, and enables the inventive system (including its storage and processing subsystems) to play back an edited video program in realtime, so that a one-hour video program will play back in precisely one hour (and not a time dependent on the amount or type of processing applied by the processing subsystem).

During playback of an edited program, the current time tells controller subsystem 3 where along the program timeline it is currently playing. To command playback of an edited program, software in the controller subsystem generates control signals from the user-determined sequence of (overlapping or non-overlapping) clips, and supplies these to subsystems 1 and 2. The control signals supplied to storage subsystem 1 specify stored scene data indexed by the current time, to determine which fields or frames of scene data are to be read out of storage subsystem 1 and processed in processing subsystem 2 at each moment. The user can modify the current time at which a particular scene will occur in the program by operating input device 5 to move a representation of the corresponding clip to a desired point along the program timeline.

For example, consider a video program defined by seven clips whose representations have been arranged as shown in FIG. 2 along a displayed program timeline. In the FIG. 2 example, coincident clip representations 4 and 5 represent a video scene and a corresponding audio soundtrack for the video scene. Partially overlapping clip representations 2 and 3 represent a first video scene (defined by clip 2) which undergoes a special effects transition to a second video scene (defined by clip 3).

Although FIG. 2 shows an audio clip representation (5) displayed end-to-end with a video clip representation (3), in preferred embodiments, audio clip representations will be displayed in different horizontal tracks (bands) on the screen than are video clip representations. Preferably, the bands and the clip representations will be color-coded. Thus, blue representations of audio clips may be displayed in one (blue-colored) band, and red representations of video clips may be displayed in a (red-colored) band vertically separated from the audio band.

To edit the program defined by FIG. 2 by eliminating the black interval between the end of clip representations 4 and 5 and the beginning of clip representation 6, the user operates input device 5 (of the FIG. 1 system) to move the representations of clips 6 and 7 (across the monitor screen) toward the left along the timeline until the leading edge (the left edge) of clip representation 6 abuts the right edge of clip representation 4. In response, the editing software in controller subsystem 3 might change the "content data" of the clips corresponding to representation 6 and 7 to reflect the new "current times" at which each of them is to occur in the program. However, in preferred embodiments, the above-mentioned "program list" data structure identifies the times in a program at which each clip is to play (this data is not stored within the clips themselves). In such embodiments, controller subsystem 3 will change the content of the program list in response to the described movement of clip representations 6 and 7, but the content data of the clips corresponding to representations 6 and 7 would not change.

When the user has edited a program (by defining the content and processing data of a set of clips, and arranging representation of the clips along the time line), the user can enter a command for controller subsystem 3 to play back the program. The controller subsystem responds to such command as follows: at each increment of "current time," controller subsystem 3 sends control signals to storage subsystem 1 identifying the content data of the scenes to be played during that current time interval; storage subsystem 1 retrieves each raw video, graphics, or audio data frame identified by such control signals from disk drives (or other storage units) therein, and sends one or more channels of the retrieved frame data (at the realtime rate) to processing subsystem 2; also at each increment of "current time," controller subsystem 3 sends control signals to processing subsystem 2 identifying the processing data of the scenes to be played during that current time interval; and processing subsystem 2 activates appropriate ones of its audio, video, and image data processors (which can be implemented in software, but are preferably implemented by dedicated hardware) to apply the appropriate processing (at the realtime rate) to the data of each raw video (and/or image and/or audio) frame received from storage subsystem 1 during the current time interval. Of course, this description is simplified in the following sense: in most actual implementations, due to processing latencies and other design limitations of subsystems 1 and 2, controller subsystem 3 will need to look ahead along the program list and issue control signals to storage and processing subsystems 1 and 2 in advance of when the video, image, and audio are actually expected to appear.

In preferred embodiments, the "clip" of the invention includes three types of data:

information data (for use by the editor for convenience during editing, but typically not to be transmitted from the controller subsystem to the storage or processing subsystems), such as a name or title for each clip and text comments about the clip;

content data (for transmission from the controller subsystem to the storage subsystem), such as clip type (e.g., video, audio, combined video and audio, or graphics), footage location (identifying the memory locations at which the raw data are stored in the storage subsystem), "play start time" (identifying the frame of stored raw data at which the scene identified by the clip is to begin), and "play stop time" (identifying the frame of stored raw data at which the scene identified by the clip is to end); and processing data (for transmission from the controller subsystem to the processing subsystem), such as color balance information, keyer controls, DVE controls, wipe/crop controls, and audio level (and other audio) controls.

In preferred embodiments, content data identifying the "current times" in the edited program at which the scene identified by each clip is to begin and end is stored in the above-mentioned "program list" data structure, separate from the clips themselves.

In preferred embodiments, the editing software in the controller subsystem allows the user to conveniently display and modify all the information, content, and processing data of each clip.

Figure 3:
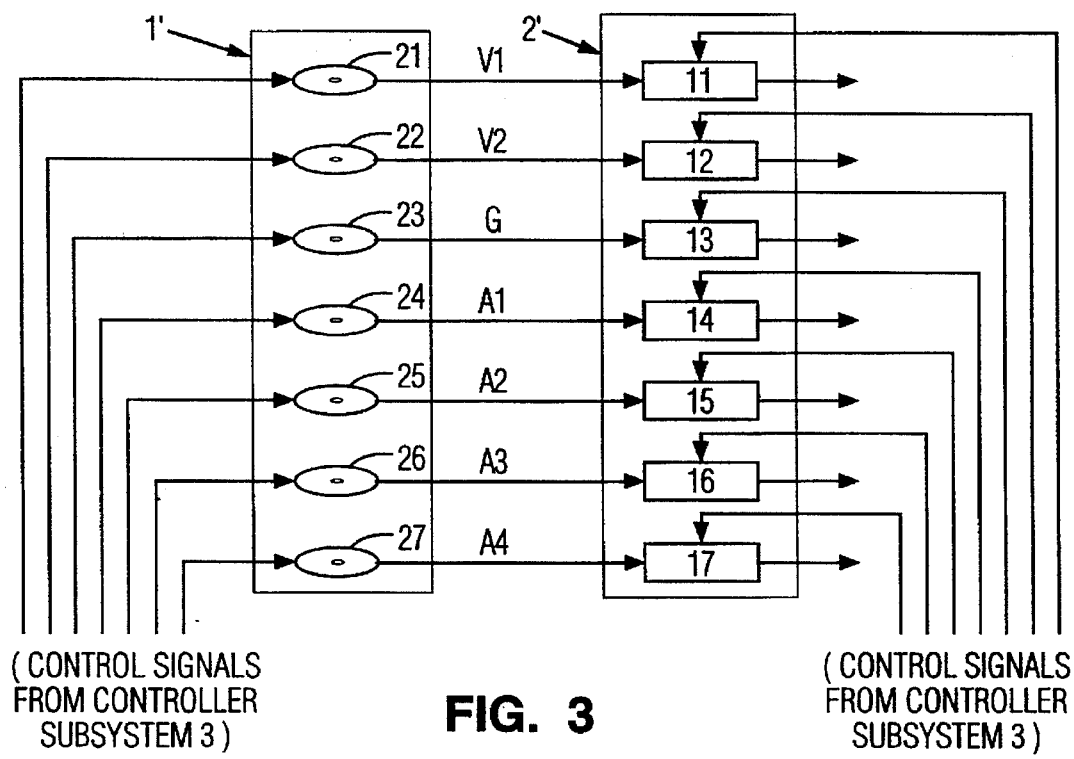
FIG. 3 is a block diagram of preferred storage and processing subsystems which can be employed in the system of FIG. 1.

FIG. 3 is a block diagram of preferred embodiments of the storage and processing subsystems of the FIG. 1 apparatus. Storage subsystem 1' of FIG. 3 (a preferred embodiment of subsystem 1 of FIG. 1) includes video disk storage devices 21 and 22, and disk storage devices 23 through 27. In response to control signals (based on "content data" of clips) from controller subsystem 3, video disk devices 21 and 22 output parallel streams V1 and V2 of video data, disk device 23 outputs stream G of graphics data, and disk devices 24, 25, 26, and 27 output parallel streams A1, A2, A3, and A4, respectively.

Processing subsystem 2' of FIG. 3 (a preferred embodiment of subsystem 2 of FIG. 1) includes parallel processors 11 through 17, each of which includes hardware for processing a different one of the data channels output from storage subsystem 1'. To each field or frame of data in video stream V1 (or a portion thereof), processor 11 applies realtime processing specified by control signals (based on "processing data" of a clip corresponding to the field or frame) received from controller subsystem 3. To each field or frame of data in video stream V2 (or a portion thereof), processor 12 applies realtime processing specified by control signals (based on "processing data" of a clip corresponding to the field or frame) from controller subsystem 3. To each frame of data in graphics stream G (or a portion thereof), processor 13 applies realtime processing specified by control signals (based on "processing data" of a clip corresponding to the frame) from controller subsystem 3. To each simultaneously received frame of data (or portion thereof) of audio streams A1, A2, A3, and A4, processors 14, 15, 16, and 17, respectively apply realtime processing specified by control signals (based on "processing data" of clips corresponding to said frames) from controller subsystem 3.

Typically, graphics stream G is video data (such as subtitles) that has been written into a microprocessor, rather than a disk device as shown in FIG. 3. In such cases, control signals similar to those shown in FIG. 3 to the microprocessor would tell the microprocessor what video data G to write into the frame buffer associated with display device 4 (but there would be no disk storage of this video data).

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for generating an edited program from scenes of data, where each of the scenes comprises frames of data, including the steps of:
   (a) generating clips representing selected ones of the scenes, each of the clips including content data identifying at least one of the scenes and processing data identifying at least one processing operation to be applied to said at least one of the scenes; and
   (b) generating the edited program in realtime in response to control signals indicative of the content data and the processing data of the clips.

2. The method of claim 1, wherein step (b) includes the steps of:
   (c) generating the control signals; and
   (d) supplying the control signals to a storage subsystem and a processing subsystem, to cause the storage subsystem to supply the selected scenes at a realtime rate to the processing system, and to cause the processing system to apply realtime processing specified by the processing data to frames of the selected scenes.

3. The method of claim 2, wherein the processing system includes at least one dedicated hardware processing means for applying said realtime processing to the frames of the selected scenes.

4. The method of claim 1, also including the steps of:
   generating a program list including data which identifies a current time for each of the clips at which a corresponding one of the scenes occurs in the edited program; and
   determining the current time for one of the clips by aligning a representation of said one of the clips along a displayed program timeline.

5. The method of claim 1, wherein the content data of each of the clips includes:
   data identifying a storage address of a corresponding one of the scenes in a storage subsystem.

6. The method of claim 1, also including the step of:
   determining a sequence of scenes in the edited program by arranging displayed representations of the clips into a sequence along a displayed program timeline.

7. The method of claim 1, wherein at least one of the clips also includes information data for use during editing of the program.

8. The method of claim 1, wherein the processing data of at least one of the clips includes color conversion parameters.

9. The method of claim 1, wherein the processing data of at least one of the clips includes parameters which at least partially specify a special effect transition between a corresponding one of the scenes and a second one of the scenes corresponding to another one of the clips.

10. An apparatus for generating an edited program from scenes of data, where each of the scenes comprises frames of data, including:
    means for generating clips representing selected ones of the scenes, each of the clips including content data identifying at least one of the scenes and processing data identifying at least one processing operation to be applied to said at least one of the scenes; and
    means for generating the edited program in realtime in response to control signals indicative of the content data and the processing data of the clips.

11. The apparatus of claim 10, wherein the means for generating clips representing selected ones of the scenes is a controller subsystem programmed with software for generating the clips, and wherein the controller subsystem is also programmed with software for generating the control signals.

12. The apparatus of claim 11, wherein the means for generating the edited program includes:
    a storage subsystem; and
    a processing subsystem, wherein the storage subsystem includes means for supplying the selected scenes at a realtime rate to the processing system in response to a first subset of the control signals, and wherein the processing system includes means for applying realtime processing specified by the processing data to frames of the selected scenes in response to a second subset of the control signals.

13. The apparatus of claim 12, wherein the storage subsystem includes means for supplying multiple channels of the scenes to the processing system, the processing subsystem includes a set of parallel dedicated hardware processors, and each of the dedicated hardware processors processes the scenes in a different one of the channels at a realtime rate for said one of the channels.

14. The apparatus of claim 13, wherein the channels include at least one channel of scenes of video data and at least one channel of scenes of audio data.

15. The apparatus of claim 14, wherein the channels include two channels of scenes of video data and four channels of scenes of audio data.

16. The apparatus of claim 14, wherein the channels also include at least one channel of scenes of image data other than video data.

17. The apparatus of claim 16, wherein the image data other than video data is graphics data.

18. The apparatus of claim 10, also including:
an input device connected to the controller subsystem; and
a display means connected to the controller subsystem.

19. The apparatus of claim 18, wherein the controller subsystem is programmed with:
software for displaying a program timeline on the display means; and
software for displaying representations of the clips on the display means along the program timeline, and determining content data of the clips by arranging the representations of said clips along the program timeline response to commands received from the input device.

20. An apparatus for generating an edited program from scenes of data, where each of the scenes comprises frames of data, including:
a storage subsystem;
a processing subsystem having inputs connected to outputs of the storage subsystem; and
a controller subsystem connected to the storage subsystem and the processing subsystem, wherein the controller subsystem includes a processor programmed with:
software for generating clips representing selected ones of the scenes, each of the clips including content data identifying at least one of the scenes and processing data identifying at least one processing operation to be applied to said at least one of the scenes; and
software for generating control signals indicative of the content data and the processing data of the clips,
wherein the storage subsystem and the processing subsystem include means for generating the edited program in realtime in response to the control signals, and wherein the controller subsystem includes means for supplying the control signals to the storage subsystem and the processing subsystem to cause said storage subsystem and said processing subsystem to generate the edited program in realtime.

21. The apparatus of claim 20, also including:
a display means connected to the processor of the controller subsystem, and wherein the processor of the controller subsystem is programmed with:
software for generating a display of representations of the clips on the display means; and
software for changing the content data and the processing data of the clips in response to modification of the display.

22. The apparatus of claim 20, wherein the storage subsystem includes means for supplying multiple channels of the scenes to the processing system, the processing subsystem includes a set of parallel dedicated hardware processors, and each of the dedicated hardware processors processes the scenes in a different one of the channels at a realtime rate for said one of the channels.

23. The apparatus of claim 22, wherein the channels include at least one channel of scenes of video data and at least one channel of scenes of audio data.

24. The apparatus of claim 23, wherein the channels include two channels of scenes of video data and four channels of scenes of audio data.

25. The apparatus of claim 23, wherein the channels also include at least one channel of scenes of graphics data.

* * * * *

UNITED STATES PATENT AND TRADEMARK OFFICE
CERTIFICATE OF CORRECTION

PATENT NO. : 5,640,320
DATED : June 17, 1997
INVENTOR(S) : Richard A. Jackson et al.

It is certified that error appears in the above-identified patent and that said Letters Patent is hereby corrected as shown below:

in column 5, line 50, "describe" should be --described--.

Signed and Sealed this

Second Day of December, 1997

Attest:

BRUCE LEHMAN

Attesting Officer

Commissioner of Patents and Trademarks